3,116,256
Patented Dec. 31, 1963

3,116,256
DAYLIGHT FLUORESCENT COMPOSITIONS
Gaetano F. D'Alelio, South Bend, Ind., and Robert W. Voedisch, Morton Grove, Ill., assignors to Lawter Chemicals, Inc., Chicago, Ill., a corporation of Delaware
No Drawing. Filed Aug. 24, 1961, Ser. No. 133,548
11 Claims. (Cl. 252—301.2)

This invention relates to daylight fluorescent materials and it relates more particularly to a resinous material employed in combination with a daylight fluorescent dyestuff in the preparation of a new and improved pigment and a vehicle for inks, paints and the like.

This is a continuation-in-part of application Serial No. 741,224, now abandoned, filed June 11, 1958, and entitled "Daylight Fluorescent Compositions and Method."

Fluorescent dyestuffs have heretofore been used in the manufacture of daylight fluorescent pigments and coatings for use in silk screen printing, letter-press inks, paints and the like. While fluorescence of the dyestuffs has remained to impart the desired increase in color intensity when such materials have been employed on suitable bases or carriers limited to indoor exposure, the fluorescigenous energy of the dyestuffs has been found to be rapidly dissipated when the base treated or coated with a daylight fluorescent material is subject to exposure to direct rays of the sun and to elements existing in the ambient atmosphere. In some instances, the fluorescence is lost within the matter of a few days of outdoor exposure.

Considerable research has been expended with a view towards increasing the fluorescent life of the various daylight fluorescent materials employed in ink or other coating compositions and particularly with respect to their stability for outdoor exposure. To the present, some success has been achieved by compounding the dyestuff with a resinous material in which the dyestuff is soluble to form a pigment to be incorporated in an ink or paint composition. The resinous material is believed to provide a protective coating for the dyestuff to minimize its destruction or deterioration upon exposure to normal atmospheric conditions.

Very few of the large number of resinous materials available on the market have been found to be capable of use in the formulation of pigments or vehicles containing the daylight fluorescent dyesuff. Some success has been achieved by the incorporation of the daylight fluorescent material in the matrix of a thermosetting resinous product, such as the condensation reaction product of urea or melamine with a formaldehyde or a condensation product formed by the reaction of a polybasic acid and a polyhydric alcohol, as in the polyester resins. When formulated of such thermosetting resinous materials, the daylight flourescent dyestuff is embodied in the resinous system while the latter is in a fluid state for solution or distribution therein. In the manufacture of a pigment, the resinous carrier is subsequently advanced to an infusible and insoluble stage where it can be ground down to the desirable particle size.

While daylight fluorescence is extended by pigmentation in the manner described, the life of the daylight fluorescent material still remains insufficient from the standpoint of the cost of the pigment and the cost of the ink or coating compositions fabricated thereof.

The fluorescent life of the pigment or coating has also been improved by the formulation of the daylight fluorescent dyestuffs in a thermoplastic resinous material of the type represented by polyvinyl acetate and vinyl acetate-vinyl chloride copolymers. However, considerable difficulty has been experienced in the use of thermoplastic resinous materials of the type described since the latter soften under the temperature conditions developed in grinding down to form the pigment with the result that the material is unsuccessfully ground down unless extensive precautions are taken to minimize temperature rise. Such resins are not amendable to commercial practice.

More recently, daylight fluorescent pigments and vehicles have been formulated of a thermoplastic resinous material formed of the combination of an aryl monosulfonamide-aldehyde reaction product with a urea or melamine formaldehyde condensation reaction product, as described in copending application Ser. No. 513,596, filed June 6, 1955, and now abandoned, and entitled "Daylight Fluorescent Compositions and Methods for the Manufacture of Same," and as described in the issued Kazenas Patent No. 2,809,954. As described, urea or melamine formaldehyde is incorporated in the combination with the aryl sulfonamide aldehyde to increase the melting point of the aryl sulfonamide aldehyde to enable grinding in pigment formation but in an amount to avoid conversion of the resinous material to an infusible or insoluble state.

While such co-condensation product of urea or melamine-formaldehyde with an aryl sulfonamide aldehyde represents an improvement over the vinyl type thermoplastic resinous systems and over the privously employed thermosetting resinous materials, it has been found that considerable improvements can yet be achieved from the standpoint of the friability of the resinous material in the manufacture of pigment; in the light-fastness of the material to prevent deterioration upon exposure in use; in the thermal stability of the material in pigmentation, manufacture and use of the coating compositions or inks, and in the wetting characteristics of the various inks, especially the letter-press inks.

Thus it is an object of this invention to produce and to provide a method for producing daylight fluorescent pigments, inks and coating compositions wherein the pigment has a higher melting point and friability and wherein the final products have improved thermal stability, light-fastness and wet-out characteristics.

The described improvements are secured, in accordance with the practice of this invention, by the formulation of a daylight fluorescent pigment or vehicle with a resinous base formed of the co-condensation reaction product of benzoguanamine (2,4-diamino-6-phenyl triazine-1-3-5) and formaldehyde with an aryl sulfonamide and formaldehyde wherein the benzoquanamine is present in an amount less than 100 percent by weight of the aryl sulfonamide and wherein the benzoguanamine is present preferably in an amount within the range of 30–60 percent of weight of the aryl sulfonamide. Within the foregoing range, a desired increase in melting point is achieved when an amount or benzoguanamine is employed within the range of 30–50% of the aryl sulfonamide, but best results are secured with the described combination when the amount of benzoguanamine is greater than 50 and up to 60 mol percent of the aryl sulfonamide, using 183 as the molecular weight of p-toluene sulfonamide and 187 as the molecular weight of benzoguanamine.

As used herein, the term "daylight fluorescent dyestuffs" is meant to include such materials as xylene Red B (2,4 disulfo benzoic acid or 2,5 disulfo benzoic acid), Rhodamine 6 GDN (ethyl ester of m-monoethylamine phenolphthalein hydrochloride), Azosol Yellow 6 GF (4 amino 1,8 naphthol 2',4' dimethyl phenyl imide), Brilliant Sulfoflavine FFA (3 sulfo 4 amino 1,8 naphthol 4' methyl phenyl imide sodium salt), Rhodamine RX (meta-diethyl amino phenolphthalein hydrochloride) having the general formula

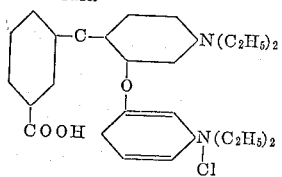

It will be understood that the above are merely representative and that other recognized daylight fluorescent dyestuffs may also be included under the term which will hereinafter be employed in the specification and in the claims.

As the aryl sulfonamide, use is preferably made of p-toluene sulfonamide but use can also be made of a mixture of o- and p-toluene sulfonamide or other aromatic monosulfonamides having two reactive hydrogens as further represented by benzene sulfonamide, naphthalene trisulfonamide and substituted sulfonamides of the types described. If desired, the aryl sulfonamide can be incorporated as such or as a pre-condensation reaction product with an aldehyde, such as formaldehyde, to an intermediate stage of polymeric growth. Ordinarily the two can be reacted in equimolecular proportions but it is often desirable to make use of an excess of the aldehyde, such as an amount up to 200 percent in excess.

As the aldehyde, it is preferred to make use of formaldehyde or its equivalent of paraformaldehyde although other aldehydes such as benzaldehyde, glyoxal, pyruvic aldehyde, and acetaldehyde can be used but with less desirable results from the standpoint of friability and hardness.

The following will represent the practice of this invention in the manufacture of pigments and vehicles, and the fabrication of paints and ink compositions therefrom:

EXAMPLE 1

*Preparation of an Ink Vehicle*

73.38 percent by weight toluene sulfonamide formaldehyde resin (Santolite MHP—Monsanto Chemical Company)
14.00 percent by weight benzoguanamine
6.00 percent by weight paraformaldehyde
4.00 percent by weight water
0.66 percent by weight Rhodamine BX
0.62 percent by weight Rhodamine 7G
1.34 percent by weight Brilliant Yellow 6G base

*Procedure*

The toluene sulfonamide aldehyde resin in an intermediate stage is reduced to a molten state and heated to a temperature of about 270° F. with agitation. The benzoguanamine is added and the mixture is held at a temperature within the range of 260–270° F. until solution is effected (about 10 minutes). The dyestuffs are added and dissolved and then the batch is allowed to cool to a temperature of about 240° F. after which the paraformaldehyde is slowly incorporated. The batch is then raised in temperature to about 290° F. over a period of from 2–2½ hours and then poured into a tray for cooling and solidification. The resulting daylight fluorescent resinous material is hard and brittle and has a softening point of 210° F. (99° C.) as determined by the ball and ring method.

EXAMPLE 2

*Preparation of a Letter-Press Ink of the Vehicle in Example 1*

51.0 percent by weight resin from Example 1
28.0 percent by weight butyl Carbitol acetate
18.0 percent by weight pigment of the orange fluorescent dye embodied in a polyvalent metal—alkyd resin complex as prepared by the French Patent 1,064,955
3.0 percent by weight dried silica gel (Santocel)

The foregoing material are mixed and then ground over a three-roll mill. The resulting daylight fluorescent ink may be printed on conventional letter-press equipment, preferably using a composition roller.

EXAMPLE 3

*Preparation of Daylight Fluorescent Pigment (Orange)*

59.18 percent by weight toluene sulfonamide formaldehyde resin (Santolite MHP)
28.00 percent by weight benzoguanamine
10.00 percent by weight paraformaldehyde (91% purity)
0.72 percent by weight Rhodamine BX
0.66 percent by weight Rhodamine 7G
1.44 percent by weight Brilliant Yellow 6G base The procedure which is followed in the formulation of the pigment corresponds to that which is set forth in Example 1. The resulting product is a daylight fluorescent orange resin which is hard and friable and which is easily ground down on a three-roll mill to a fine pigment. It has a softening point of 264° F. (129° C.) as determined by the ball and ring method.

EXAMPLE 4

*Preparation of Daylight Fluorescent Pigment (Orange)*

48.50 percent by weight of a mixture of o- and p-toluene sulfonamide (Santicizer 9)
25.00 percent by weight benzoguanamine
18.00 percent by weight paraformaldehpde (91% purity)
6.00 percent by weight water
0.63 percent by weight Rhodamine BX
0.59 percent by weight Rhodamine 7G
1.28 percent by weight Brilliant Yellow 6G base The Santicizer 9, a product of Monsanto Chemical Company, was reduced to a molten state at about 260° F. in a reaction vessel which is equipped with a heavy duty mixer. The paraformaldehyde was added with resultant cooling and the temperature was brought back slowly to about 240° F. over a period of 10–15 minutes. To the clear solution the dyestuffs were added and after the dyestuffs were dissolved, the benzoguanamine was slowly added and the temperature gradually brought back to about 240° F. The Rhodamine BX dissolved in the water was added and the batch temperature was then gradually raised to 290° F. over a period of 2–2½ hours. The materials were then poured into a tray and cooled. The final product which was a very friable and highly resinous material was found to have a softening point of 312° F. (155° C.). The resin can be easily ground to form a fine daylight fluorescent orange pigment.

EXAMPLE 5

*Preparation of a Silk Screen Lacquer From the Pigments of Example 3 or 4*

55.0 percent by weight polyacrylic resin solution (Acryloid F–10)
40.0 percent by weight pigment from Example 3 or 4
0.8 percent by weight dried expanded silica gel (Santocel 54)
4.2 percent by weight mineral spirits The ingredients are mixed and ground down over a three-roll mill. The resulting silk screen ink has a brilliant orange shade and can be effectively used in silk screen printing or the like.

EXAMPLE 6

*Preparation of Daylight Fluorescent Yellow Pigment*

40.7 percent by weight toluene sulfonamide-formaldehyde resin (Santolite MHP)
30.5 percent by weight benzoguanamine
26.4 percent by weight formalin (37% formaldehyde)
2.4 percent by weight Brilliant Yellow 6G base The procedure for preparation is similar to that of Example 1 with the formalin being introduced in the same point in the reaction as was the paraformaldehyde. The softening point of the resin was 132° C. (Ball and Ring method). It may be ground to a daylight fluorescent yellow pigment which is suitable for use in the silk screen ink composition as set forth in Example 5.

EXAMPLE 7

*Preparation of Daylight Fluorescent Letter-Press Ink*

43.0 percent by weight quickset varnish
18.4 percent by weight gloss varnish
36.5 percent by weight pigment of Example 6
0.6 percent by weight cobalt naphthenate (6%)
1.5 percent by weight phthalocyanine green This material is mixed and then milled on a roller mill. Several passes are taken until a Hegman Gage reading of 7 NS is obtained. The resulting product can be printed on any conventional letter-press.

The following table will set forth some of the work that we have performed with reference to the ratio of benzoguanamine to the aryl sulfonamide or the aryl sulfonamide-aldehyde condensation reaction product and with further reference to the ratio of benzoguanamine with formaldehyde and the resulting effect on the softening point as determined by the Ball and Ring method.

| Resin No. | Santolite MHP (grams) | Benzo-guanamine | Paraform-aldehyde 91% (gram-moles) | Other softening point, ball and ring | |
|---|---|---|---|---|---|
| | | | | Deg. F. | Deg. C. |
| III | 200 | 0.2 | 0.8 | 225 | 107 |
| IV | 200 | 0.2 | 0.4 | 219 | 104 |
| V | 200 | 0.5 | 1.0 | 264 | 129 |
| VI | 200 | 0.5 | 0.75 | 298 | 148 |
| VII | 200 | 0.5 | 0.75 | 246 | 119 |
| VIII | 200 | 0.55 | 1.10— | 260 | 127 |

In the foregoing table, 187 grams was used as the gram-mole weight of benzoguanamine and 30 grams was used as the gram-mole weight of paraformaldehyde. A factor of .9 was used with the paraformaldehyde—this being the purity factor of the formaldehyde in paraformaldehyde of a commercial grade. Assuming that Santolite MHP comprises the reaction product of p-toluene sulfonamide with from 1 to 2 moles of formaldehyde, the amount of p-toluene sulfonamide will be calculated to be slightly less than 1 mole per 200 grams of Santolite MHP. Thus, an amount of benzoguanamine equivalent to 0.5 gram-mole per 200 grams of Santolite MHP will correspond to a mole ratio of benzoguanamine to aryl sulfonamide which is slightly greater than 0.5 mol percent while the 0.55 mole gram of benzoguanamine in the foregoing table will correspond to about 0.56 to 0.57 mole percent of the aryl sulfonamide.

For pigment formulation, it is desirable to make use of the harder and more friable resins, as represented by the resins identified by the numbers V, VI, VII and VIII, each of which has a softening point above 245° F. The other resinous systems as well as the resins previously referred to can advantageously be employed in a dissolved state in a carrier for letter-press or other printing inks.

It will be apparent from the foregoing that we have produced a new and improved daylight fluorescent composition in the form of a vehicle or pigment and paints or ink compositions formulated thereof characterized by greater life stability, improved friability and hardness, better wetting out characteristics and improved light-fastness. It has been found further that the system that is formed is highly resistant to attack by alkali which therefore enables pigments to be incorporated in emulsion paints and inks. The coatings are also more resistant to attack by elements normally coming into contact therewith. All of these are important to extend the utility and life of the daylight fluorescent materials as a printing ink or coating composition.

It will be understood that changes may be made in the details of formulation without departing from the spirit of the invention, especially as defined in the following claims.

We claim:

1. A daylight fluorescent material consisting essentially of the combination of a daylight fluorescent dyestuff in a resinous base formed by the co-condensation of an aryl sulfonamide-aldehyde and benzoguanamine and aldehyde wherein the aryl sulfonamide is selected from the group consisting of p-toluene sulfonamide and o-toluene sulfonamide and mixtures thereof and wherein the aldehyde is selected from the group consisting of formaldehyde and paraformaldehyde, wherein the daylight fluorescent dyestuff is present in an amount sufficient to impart daylight fluorescence and the benzoguanamine is present in an amount within the range of more than 50 but less than 60 mol percent of the aryl sulfonamide.

2. A daylight fluorescent material consisting essentially of the combination of a daylight fluorescent dyestuff in a resinous base formed by the co-condensation of an aryl sulfonamide formaldehyde and benzoguanamine and formaldehyde wherein the aryl sulfonamide is selected from the group consisting of p-toluene sulfonamide and o-toluene sulfonamide and mixtures thereof, wherein the daylight fluorescent dyestuff is present in an amount sufficient to impart daylight fluorescence and the benzoguanamine is present in an amount within the range of more than 50 but less than 60 mol percent of the aryl sulfonamide.

3. A daylight fluorescent material as claimed in claim 1 in which the aryl sulfonamide and the aldehyde are separately reacted by condensation to an intermediate stage of polymeric growth.

4. A daylight fluorescent material as claimed in claim 1 in which the benzoguanamine and the aldehyde for reaction therewith are present in the ratio of 1 molecular weight of benzoguanamine to 1.4–4 molecular weights of the aldehyde.

5. A daylight fluorescent material as claimed in claim 1 in which the benzoguanamine and the aldehyde are present for reaction therewith in the ratio of 1 molecular weight of benzoguanamine to 1.4–2 molecular weights of the aldehyde.

6. A daylight fluorescent pigment formed of the combination of the daylight fluorescent dyestuff embodied in a completely condensed and particulated resinous base formed by the co-condensation of an aryl sulfonamide-aldehyde and benzoguanamine-aldehyde wherein the aryl sulfonamide is selected from the group consisting of p-toluene sulfonamide, o-toluene sulfonamide and mixtures thereof, wherein the aldehyde is selected from the group consisting of formaldehyde and paraformaldehyde and wherein the daylight fluorescent dyestuff is present in an amount sufficient to impart daylight fluorescence and the benzoguanamine is present in an amount within the range of more than 50 and up to 60 mol percent of the aryl sulfonamide.

7. A daylight fluorescent pigment as claimed in claim 6 in which the aldehyde is added as a component separate and apart from the benzoguanamine and the aryl sulfonamide.

8. A daylight fluorescent pigment as claimed in claim 6 wherein the sulfonamide is incorporated in an intermediate stage of condensation reaction with formaldehyde.

9. A daylight fluorescent pigment as claimed in claim 6 in which the benzoguanamine and the aldehyde present for reaction therewith is embodied in the ratio of 1 mol benzoguanamine to 1.4 to 4 mols of the aldehyde.

10. A daylight fluorescent vehicle consisting essentially of a fluid carrier, a daylight fluorescent dyestuff and a substantially complete condensed thermoplastic resinous material which is present in the system and formed of the co-condensation reaction of an aryl sulfonamide and aldehyde and benzoguanamine and aldehyde wherein the aryl sulfonamide is selected from the group consisting of p-toluene sulfonamide, o-toluene sulfonamide and mixtures thereof, wherein the aldehyde is selected from the group consisting of formaldehyde and paraformaldehyde and wherein the daylight fluorescent dyestuff is present in an amount sufficient to impart daylight fluorescence and the benzoguanamine is present in the ratio of more than 50 and up to 60 mol percent of the aryl sulfonamide.

11. A daylight fluorescent vehicle as claimed in claim 10 in which the benzoguanamine and the aldehyde present for reaction therewith are present in the ratio of 1 mol benzoguanamine to 1.2 to 4 mols of the aldehyde in the form of formaldehyde.

References Cited in the file of this patent

UNITED STATES PATENTS

| | | |
|---|---|---|
| 2,794,008 | Ginsler | May 28, 1957 |
| 2,809,957 | Kazenas | Oct. 15, 1957 |
| 2,938,873 | Kazenas | May 31, 1960 |